June 17, 1958 V. A. BOUFFORT 2,839,146
KNOCKDOWN MOTOR VEHICLE OF SCOOTER TYPE
Filed April 19, 1957 3 Sheets-Sheet 1
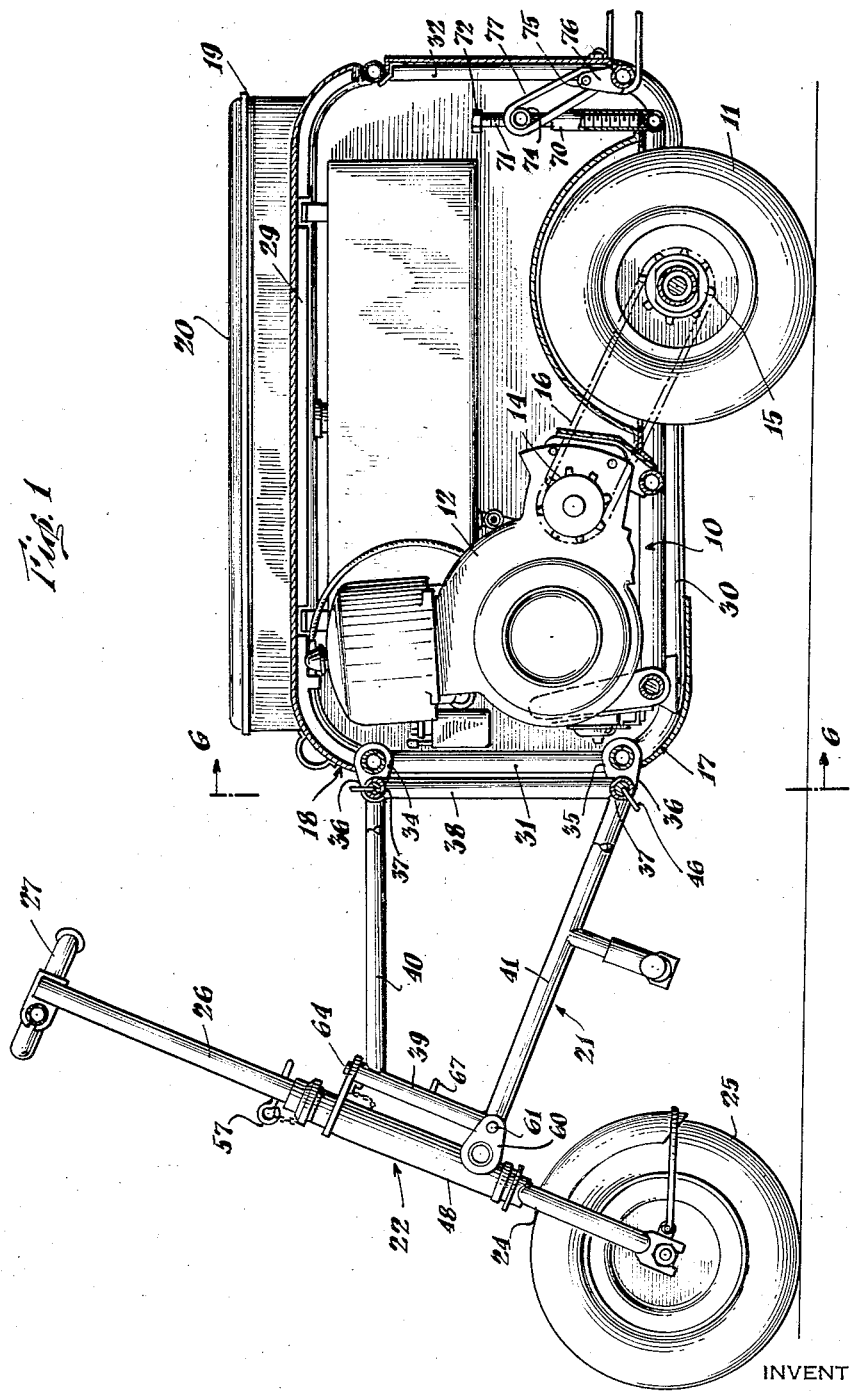
INVENTOR
Victor Albert Bouffort
BY
Leo C. Krazinski
ATTORNEY June 17, 1958 V. A. BOUFFORT 2,839,146
KNOCKDOWN MOTOR VEHICLE OF SCOOTER TYPE
Filed April 19, 1957 3 Sheets-Sheet 2
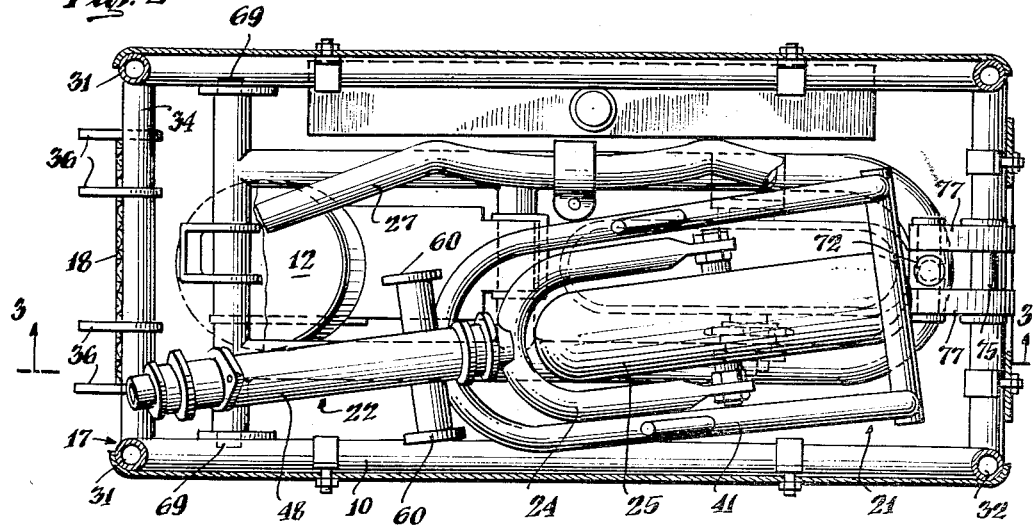
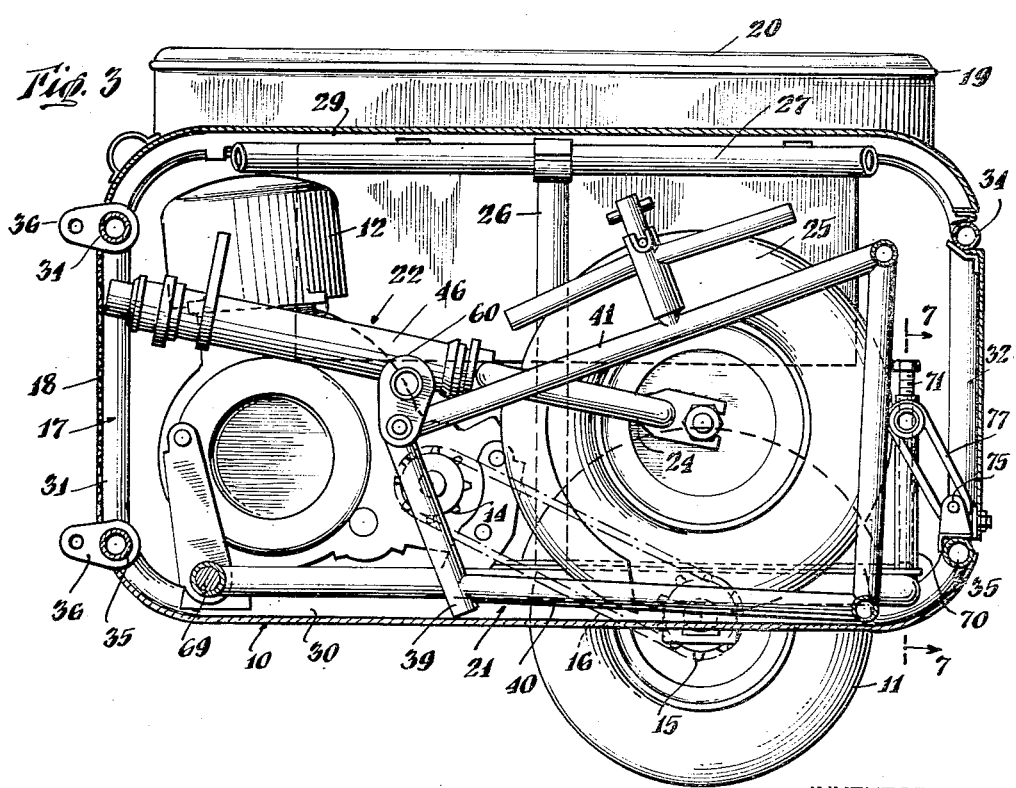
INVENTOR
*Victor Albert Bouffort*
BY
*Leo C. Krazinski*
ATTORNEY

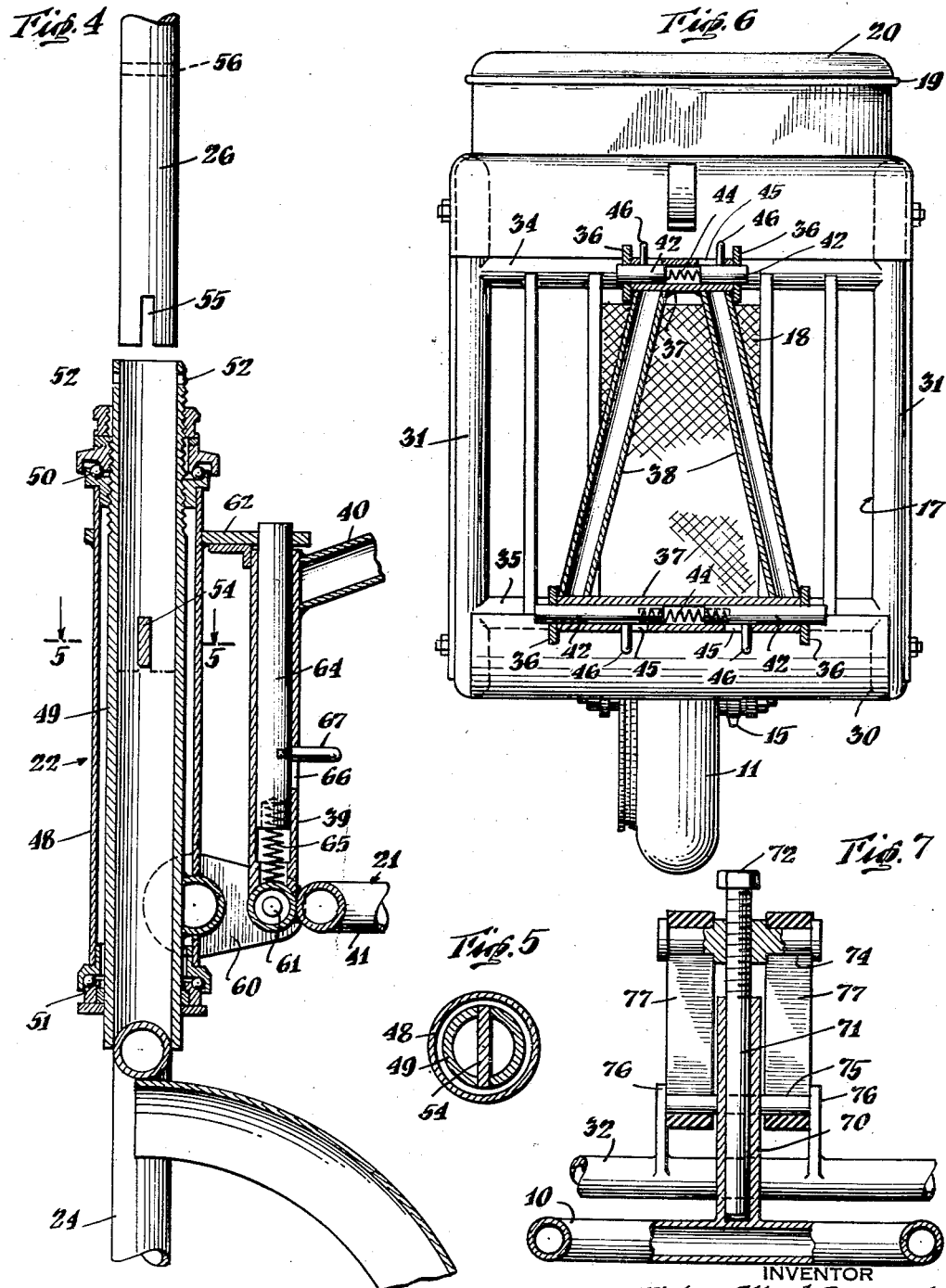

United States Patent Office 2,839,146
Patented June 17, 1958

2,839,146

KNOCKDOWN MOTOR VEHICLE OF SCOOTER TYPE

Victor Albert Bouffort, Bondy, France

Application April 19, 1957, Serial No. 653,814

5 Claims. (Cl. 180—33)

The present invention relates to motor vehicles and, more particularly, to vehicles generally known as motor scooters.

Motor scooters generally comprise a chassis for mounting a driving wheel and a motor, such as a low power internal combustion engine, in driving connection with the wheel, a box-like structure supported on the chassis for enclosing the engine and the upper portion of the wheel and also for serving as a seat for the driver or operator, and a front frame assembly secured to the chassis for supporting a steering head including a front wheel and handle bars or the like.

Heretofore, it has been proposed to construct the front frame in a manner whereby the elements thereof could be dismantled and placed into the box-like structure for storage. The difficulty with such prior arrangements has been that too many elements were required to be taken apart and that the means for providing removable securement of these elements were so difficult to operate whereby tools were required with the result that dismantling and reassembling of the numerous parts was time consuming and inconvenient. Also, considerable difficulty was encountered in assembling the chassis, the front frame, and the box-like structure in a manner to cushion the operator against shock while sitting on the seat.

Accordingly, an object of the present invention is to provide an improved motor scooter construction which is not subject to the foregoing difficulties and disadvantages.

Another object is to provide such a motor scooter wherein a minimum number of front frame elements require disconnection to store the same in the box-like structure or casing.

Another object is to provide a minimum number of connecting means which are readily operated by hand to dismantle and reassemble the front frame elements with a minimum of effort.

Another object is to provide a scooter wherein the front frame assembly is removably secured to a box-like frame which is pivotally and resiliently mounted on the chassis and which serves as a support for the casing.

A further object is to accomplish the foregoing objects in a simple, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Fig. 1 is a side view, partly in elevation and partly in section, of a motor scooter in accordance with the present invention.

Fig. 2 is a plan view, partly in section, illustrating the front frame assembly dismantled and placed in the casing for storage.

Fig. 3 is a sectional view taken substantially along the line 3—3 on Fig. 2.

Fig. 4 is an enlarged, fragmentary longitudinal sectional view taken through the steering head illustrating means for removably securing the same to elements of the front frame.

Fig. 5 is a sectional view taken along the line 5—5 on Fig. 4.

Fig. 6 is a sectional view taken along the line 6—6 on Fig. 1 illustrating means for removably securing the front frame to the box-like frame.

Fig. 7 is a sectional view taken along the line 7—7 on Fig. 3 illustrating the shock absorber.

Referring to the drawings in detail and more particularly to Figs. 1, 2 and 3, there is shown a motor scooter which generally comprises a chassis 10, a driving wheel 11 rotatably mounted on the chassis adjacent the rear thereof, an engine 12 mounted on said chassis adjacent the front thereof, a driving connection between the engine and the wheel including sprockets 14 and 15 and a chain 16, a box-like frame 17 supported on the chassis and within which the engine, the driving connection and the upper portion of the wheel are located, a casing 18 including elements for enclosing the sides, the front and the rear of the frame 17 and having an open top for receiving a cover 19 having a seat cushion 20 thereon, a front frame assembly 21 including a steering head 22, a steering fork 24, a front wheel 25 rotatably mounted on the fork, a steering post 26 for turning the fork, handle bars 27 at the upper end of the steering post, and means for detachably securing elements of the front frame assembly to each other and to the frame 17 in the manner about to be described.

The box-like frame 17 comprises a pair of upright rectangular frames each having top, bottom, front and rear portions 29, 30, 31 and 32, respectively, and upper and lower transverse members 34 and 35 secured between the front and rear portions 31 and 32 of the frame. The front upper and lower transverse members each have a pair of apertured, spaced apart lugs 36 secured thereon which extend forwardly, with the lower lugs spaced further apart than the upper lugs. These lugs are provided for detachably securing the front frame assembly 21 to the frame 17, as about to be described.

The frame section of the front frame assembly 21 comprises upper and lower transverse sleeves 37 at the rear adapted to fit respectively between the pairs of upper and lower lugs 36 (Fig. 6), upwardly converging struts 38 secured between the sleeves 37, a tubular front section 39 (Figs. 1 and 4), and upper and lower side members 40 and 41, respectively, secured between the sleeves 37 and the front section 39.

As shown in Fig. 6, the sleeves 37 are each detachably secured between a pair of lugs 36 by a slidable rod 42 at each end which is urged outwardly of the sleeve by a spring 44 contained in the sleeve and which extends into the aperture of a lug 36. The rods 42 are retained within the sleeves 37 and arranged for retracting the same in opposition to the spring 44 to disengage the lugs by providing the sleeves with a longitudinal slot 45 adjacent each end thereof and mounting a pin 46 on each rod which extends through a slot. The pins 46 are disposed in a common plane to facilitate grasping the same and moving them towards each other to retract the rods 42, whereby the entire front frame assembly 21 can be disconnected from the frame 27 in two easy operations.

As shown in Fig. 4, the steering post 26 is removably mounted on the steering head 22 and the front section 39 is connected to the steering head 22 to enable the front wheel 25 and its fork 24 to be nested within the cage-like structure provided by the front frame elements 37, 38, 40 and 41.

In order to effect removal of the steering post 26 the steering head 22 includes a tube 48, and the front wheel work 24 has an upper tubular section 49 which extends through the tube 48 and is journalled for rotation therein by upper and lower bearings 50 and 51, respectively. The tubular section 49 has a pair of diametrically opposite openings 52 adjacent its upper end and has a transverse key 54 well below these openings. This key is readily provided by slotting the tubular fork section, setting the ends of a rectangular plate in the slots and welding the plate to the tubular fork section (Fig. 5). The lower end of the steering post has a transverse slot 55 for receiving the key 54 and has a transverse bore 56 well above its lower end adapted to register with the openings 52, whereby a removable pin 57 (Fig. 1) can be inserted through the openings and the bore to detachably secure the steering post to the steering head.

Nesting of the front wheel within the front frame cage structure is made possible by linkage connecting the steering head 22 and the front section 39. As shown in Fig. 4, this linkage is provided by a pair of vertical lugs 60 secured to the lower end of the steering head tube 48 and by a pin 61 which pivotally connects the lower end of the front frame section 39 between these lugs. The upper end of the section 39 is arranged to be removably attached to the tube 48 by a locking device similar to that already described in connection with the sleeves 37 and lugs 36. This locking arrangement comprises a horizontally apertured lug 62 secured to the tube 48 below the upper bearing 50 and adapted to overlie the upper end of the section 39, a rod 64 slidably mounted in the section 39, and a spring 65 beneath the rod 64 for urging its upper end outwardly of the section and into the aperture of the lug 62 in locking engagement therewith. In order to retract the rod 64, the section 39 is formed with a slot 66 and a pin 67 on the rod extends outwardly through the slot to facilitate manual engagement thereto to depress the rod and release the lug.

The arrangement just described requires only four operation by releasing secured elements of the front frame assembly and enable these elements to be conveniently stored in the casing, as shown in Figs. 2 and 3.

Another novel feature of the motor scooter in accordance with the present invention is the manner in which the front frame assembly 21 and the chassis 10 are interconnected by means of the frame 17 to provide for better shock absorption. This is accomplished by pivotally mounting the chassis and the bottom portions 30 adjacent the front thereof at 69 (Fig. 2), and providing an improved snubbing arrangement between the chassis and the frame at the rear (Figs. 1, 2, 3 and 7).

As shown in Fig. 7, this arrangement comprises an upright, tubular post 70 on the chassis 10, a rod 71 extending into the post having an upper threaded section and a nut head 72 at the top thereof, a cross-arm 74 through which the rod 71 is threaded, a cross-rod 75 mounted between lugs 76 on the bottom rear frame portion 32 adjacently beneath the cross-arm, and a pair of resilient bands 77 passing over the ends of the cross-arm 74 and under the rod 75. By turning the rod 71 to raise or lower the cross-arm the tension of the bands 77 can be regulated to get the desired snubbing action.

From the foregoing description, it will be seen that the present invention provides an improved motor scooter which can be dismantled for storage in a rapid and convenient manner without the use of tools. The detachable elements are dimensioned and linked together in a manner to enable the same to be stored compactly within the casing for housing the engine and providing the seat for the operator.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a motor scooter, the combination of a chassis for a driving wheel and an engine; a box-like frame mounted on said chassis including upper and lower horizontal sections at the front thereof; casing means mounted on said frame to provide an enclosure; a pair of spaced vertical lugs on said upper and lower sections each having an aperture extending horizontally therethrough; a front frame including upper and lower horizontal sleeves each positioned between a pair of said lugs, structural means connecting said sleeves, a front section disposed in a vertical plane, upper and lower members having the rear ends respectively secured to said upper and lower sleeves and having the front end secured to said front section; a steering head including a tube; a fork having a tubular section in said tube, a front wheel mounted on said fork; and a steering post having handle bars at its upper end and having its lower portion disposed in said tubular section for turning said fork; means for detachably securing said front section to said tube; means for detachably securing said sleeves to said lugs; and means for detachably connecting said post and said tubular fork section, said front frame and said steering head components being dimensioned to be stored in said enclosure when detached.

2. A motor scooter according to claim 1, wherein said means for detachably securing said sleeves to said lugs include a pair of slidable rods in each of said sleeves, each rod having an end portion adapted to extend into an aperture of one of said lugs, a spring between each pair of said rods for urging said end portions into said apertures, each sleeve having a pair of longitudinal slots, and a pin on each of said rods extending through said slots adapted to be manually engaged to withdraw said rods from said apertures.

3. A motor scooter according to claim 1, wherein said front section is tubular and said means for detachably securing said front section to said tube include means for pivotally attaching the lower end of said front section adjacent the lower end of said tube, a horizontal ear having an aperture extending vertically therethrough and positioned over the upper end of said front section, a rod element in said front section having an upper portion adapted to extend into the aperture of said ear, a spring in said front section for urging said rod element upwardly, said front element having a longitudinal slot, and a pin on said rod element extending through said slot adapted to be manually engaged to withdraw said rod element from the aperture of said ear.

4. A motor scooter according to claim 1, wherein said means for detachably connecting said post and said tubular fork section include a diametrically extending key in said fork section, said post having a slot at its lower end for receiving said key and having a bore extending transversely therethrough above said slot, said fork section having a pair of diametrically opposite openings adapted for alignment with said bore when said key is in said slot, and a removable pin extending through said bore and said openings.

5. In a motor scooter, the combination of a chassis; casing means on said chassis including a box-like frame having transverse upper and lower front members; a front frame assembly including a cage-like structure having rear upper and lower transverse members and an upright front section, a steering head, a front wheel, a fork supporting said front wheel mounted in said steering head, and a steering post having handle bars thereon; means for removably securing said upper and lower front and rear members; means for detachably securing said steering post and said fork; means for pivotally connecting said front section and said steering head; and means for detachably securing said front section and said steering head, whereby said front wheel is adapted to be nested in said cage-like structure when said steering post is removed and said front section and steering head are released, said front frame assembly members being dimensioned to be stored in said casing when dismantled in the aforementioned manner.

References Cited in the file of this patent

UNITED STATES PATENTS

| | | |
|---|---|---|
| 2,589,793 | Franks | Mar. 18, 1952 |
| 2,696,272 | Schlaphoff | Dec. 7, 1954 |

FOREIGN PATENTS

| | | |
|---|---|---|
| 83,517 | Austria | Apr. 11, 1921 |
| 825,808 | Germany | Dec. 20, 1951 |